(12) United States Patent  
Kung et al.

(10) Patent No.: US 7,079,134 B2  
(45) Date of Patent: Jul. 18, 2006

(54) THREE-DIMENSIONAL DIGITAL METHOD OF DESIGNING CLOTHES

(75) Inventors: Alexandre Keung-Lung Kung, Paris (FR); Arnaud Fernand Philippe Gabriel Mandard, Le Vesinet (FR)

(73) Assignees: Societe Civile T.P.C. International, Paris (FR); TPC (HK) Limited, Kowloon (HK)

( * ) Notice: Subject to any disclaimer, the term of this patent is extended or adjusted under 35 U.S.C. 154(b) by 343 days.

(21) Appl. No.: 09/959,965

(22) PCT Filed: May 11, 2001

(86) PCT No.: PCT/FR01/01422

§ 371 (c)(1),  
(2), (4) Date: Nov. 14, 2001

(87) PCT Pub. No.: WO01/86512

PCT Pub. Date: Nov. 15, 2001

(65) Prior Publication Data

US 2003/0011590 A1 Jan. 16, 2003

(30) Foreign Application Priority Data

May 12, 2000 (FR) .......................................... 00 06069

(51) Int. Cl.  
*G06T 17/00* (2006.01)

(52) U.S. Cl. ...................................................... 345/420

(58) Field of Classification Search ................ 345/419, 345/420  
See application file for complete search history.

(56) References Cited

U.S. PATENT DOCUMENTS

| 5,495,568 A | 2/1996 | Beavin |
| 5,850,222 A | 12/1998 | Cone |
| 6,404,426 B1 * | 6/2002 | Weaver ...................... 345/419 |

OTHER PUBLICATIONS

Capin, et al., "A dead–Reckoning Algorithm for Virtual Human Figures", pp. 161–169, Albuquerque, Mar. 1–5, 1997, Los Alamitos, IEEE Comp. Soc. Press, US, Mar. 1, 1997.

Nariyama et al. "Realistic 3D Synthesis of Human Body Movements for Vitual Space Teleconferencing", Proceedings of the Iasted International Conference. Modelling and Simulation, Apr. 1999.

English translation of International Preliminary Examination Report dated Aug. 22, 2002.

* cited by examiner

*Primary Examiner*—Almis R. Jankus  
(74) *Attorney, Agent, or Firm*—Stevens, Davis, Miller & Mosher, LLP

(57) ABSTRACT

This method allows direct 3D tailoring of a garment. It includes the steps of 3D-digitizing of a human body, of tracing a 3D mesh representing the garment over the 3D image of the body, and of modifying selectively the distance between the mesh and the body so as to visualize immediately in 3D how the garment fits to the body.

14 Claims, 13 Drawing Sheets

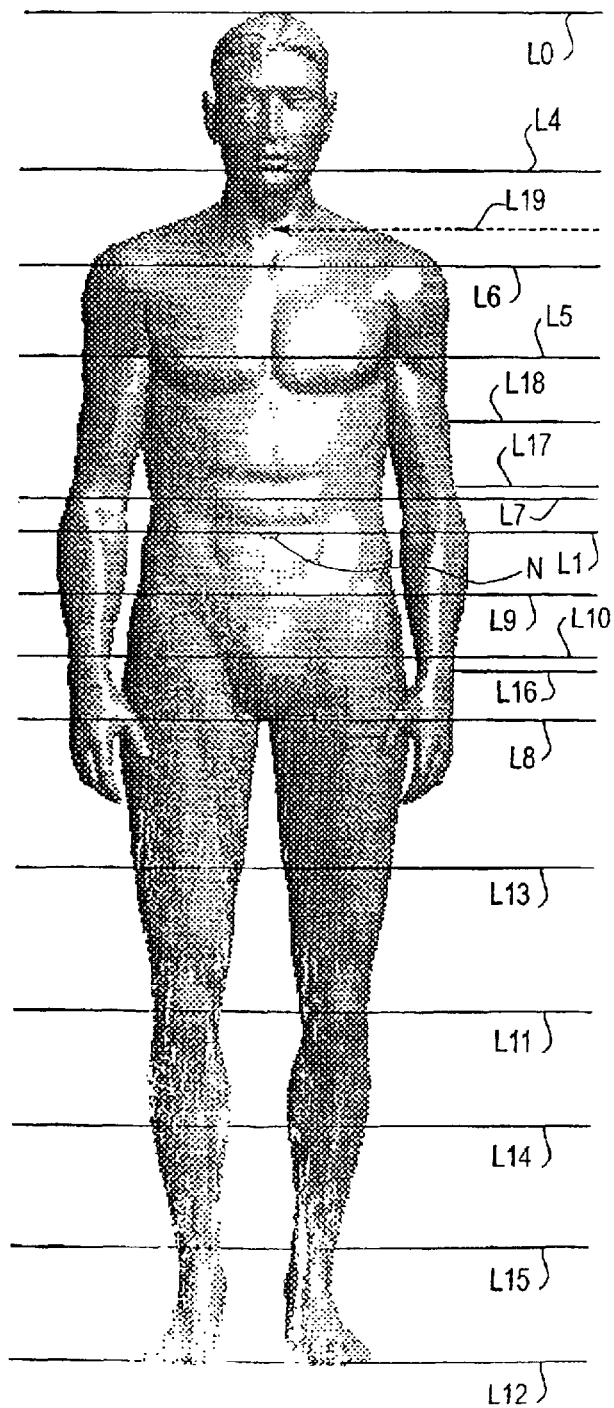
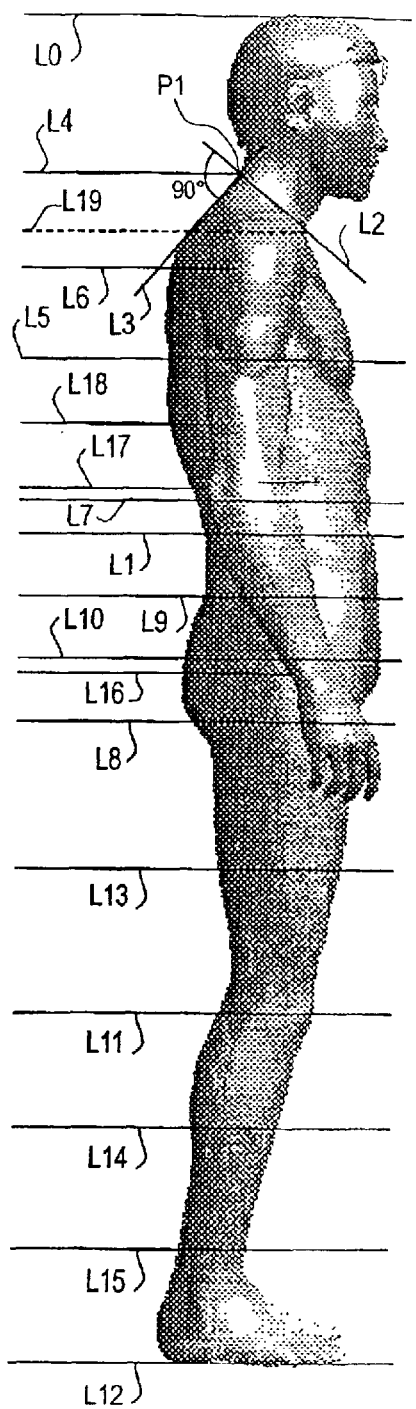
FIG. 1A
FIG. 1B

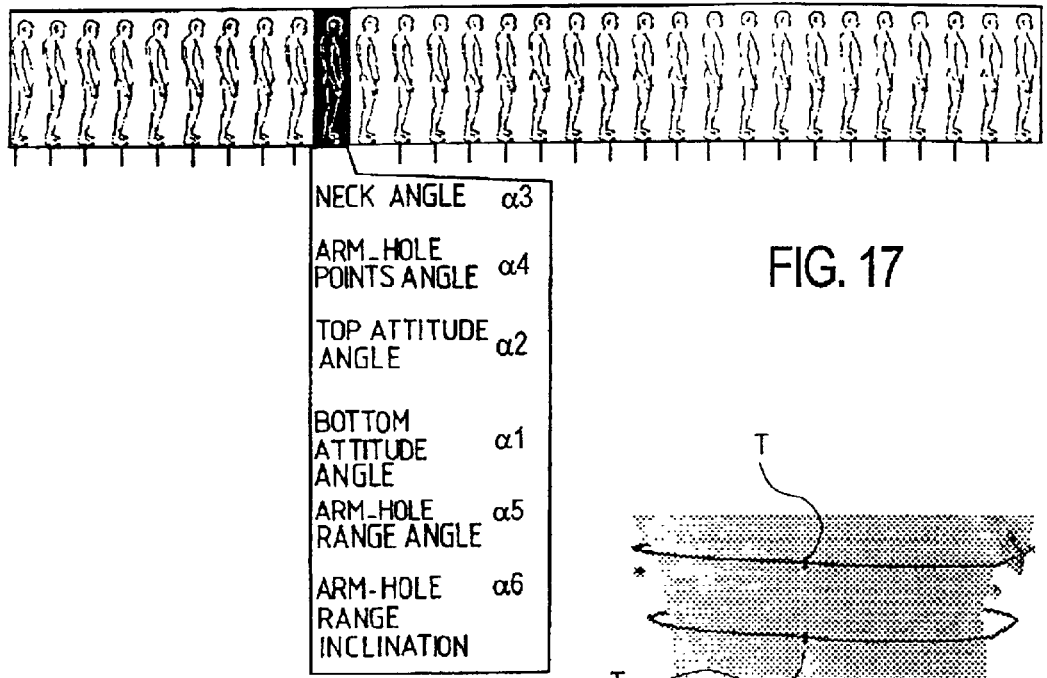
FIG. 17
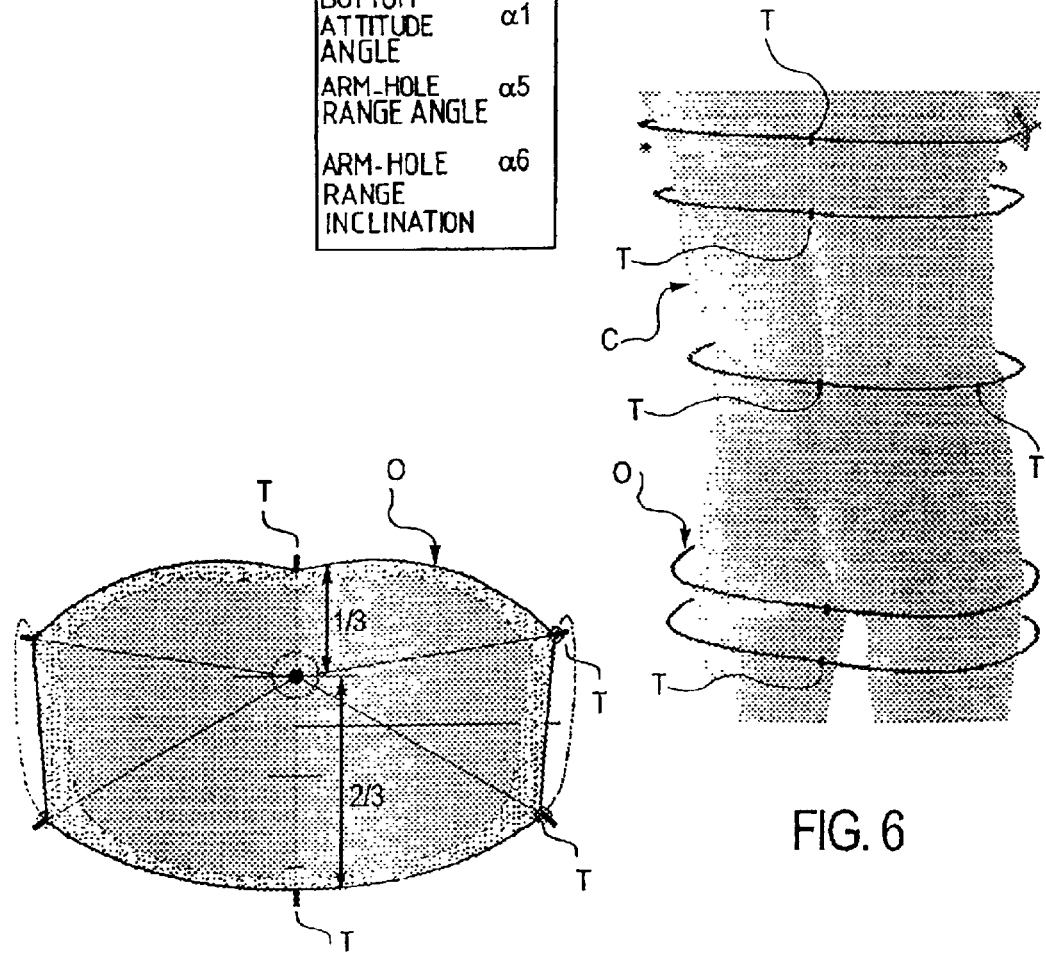
FIG. 6
FIG. 7

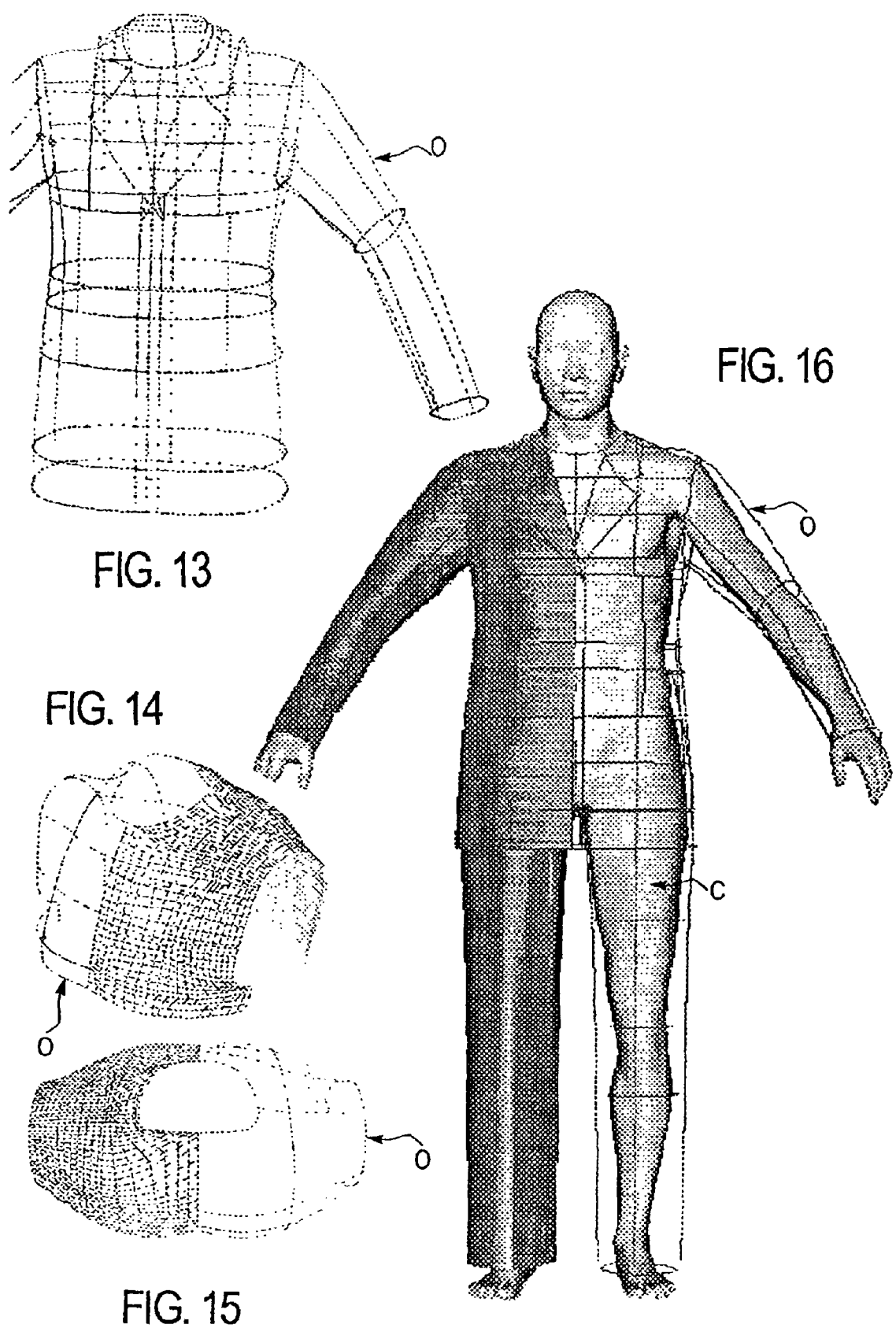

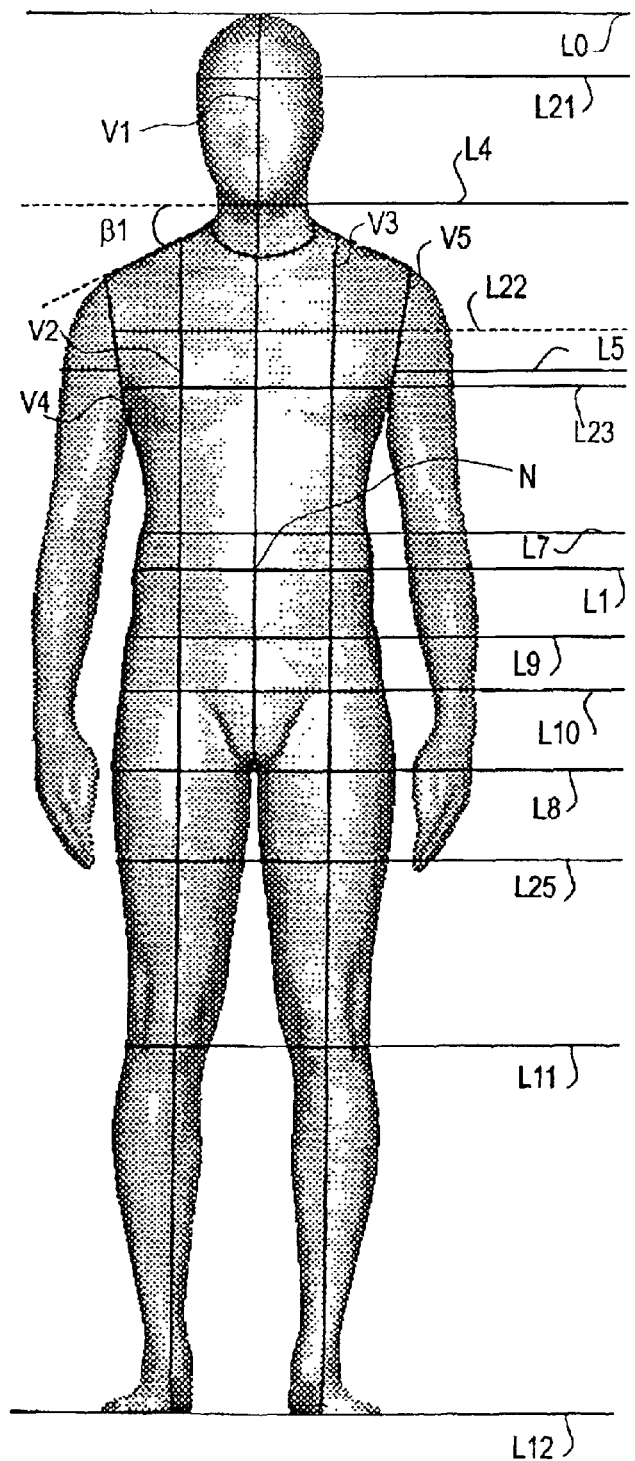
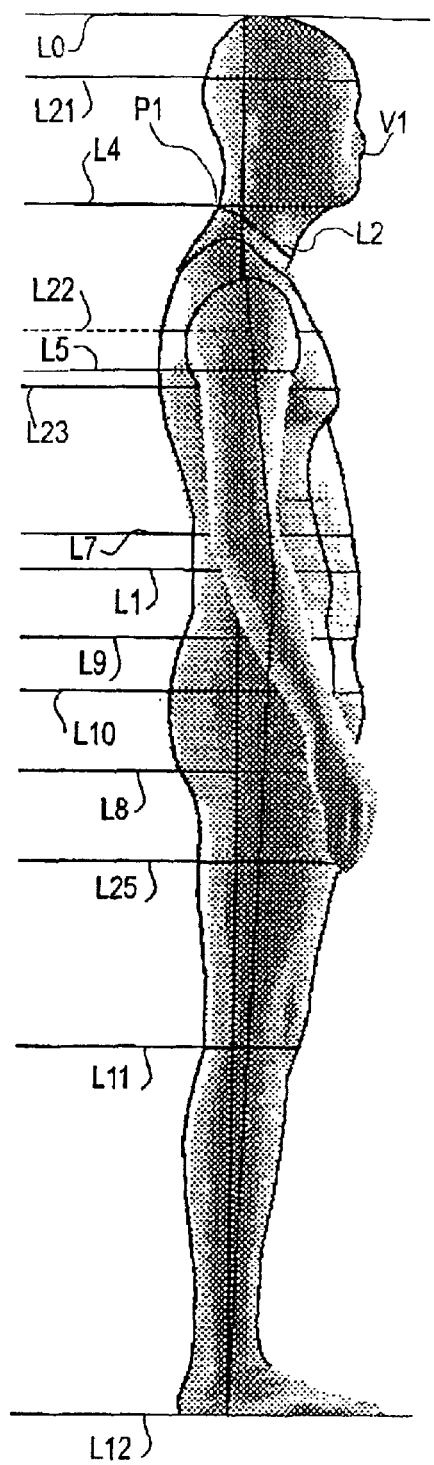
FIG. 17A
FIG. 17B

Typical table of morphological variation
for a modulatable body

| • Stature (L0-L12 in cm) | 160 | 165 | 170 | 175 | 180 | 185 | 190 | 195 | 200 |
|---|---|---|---|---|---|---|---|---|---|
| • Trunk % | 62,5 | | 60 | | 55 | | 50 | | |
| • Inseam % | 37,5 | | 40 | | 45 | | 50 | | |
| • Attitude (α1;α2) | 6° | | | 7° | | | 8° | | |
| • Size (Unit = 1/2 L5) | 46 | 48 | 50 | 52 | 54 | 56 | 58 | 60 | 62 |
| • Shoulder slope (β1) | 15° | 17,5° | 20° | 22,5° | 25° | 27,5° | 30° | | |
| • Drop (L5-L7) Male specific | 8 | 7 | 6 | 5 | 4 | 3 | 2 | 1 | 0 |
| Posture RZ V4 - V5 | 10° | 9° | 8° | 7° | 6° | 5° | 4° | 3° | 2° |
| Posture RY CA - CD | 7° | 6° | 5° | 4° | 3° | 2° | 1° | 0° | 0° |

FIG. 22a

Female specific parameters

| • European standard size | 34 | 36 | 38 | 40 | 42 | 44 | 46 |
|---|---|---|---|---|---|---|---|
| • Cup | AA | A | B | C | D | DD | E |
| • Underbust (cm) | 65 | 70 | 75 | 80 | 85 | 90 | 95 |

FIG. 22b

THREE-DIMENSIONAL DIGITAL METHOD OF DESIGNING CLOTHES

The present invention concerns a three-dimensional digital method of designing clothes.

The concept of freedom of movement, in a garment, corresponds to the difference, at a given point on or over a given area of the body, between the measurements of the body to be covered and the measurements of the garment for clothing it, as much to ensure the total absence of impediment to the wearer, whilst preserving poise, as to impart the required silhouette. This necessarily technical fullness as much as styling (volume, curve) must, by extension, take account of intermediate layers of clothing that have their own requirements in terms of freedom of movement and attractiveness.

This expansion, this enlargement, is traditionally obtained either by adding an increase in the measurement adopted for constructing the garment to the pattern itself at such and such a point or over such and such an area, or by molding a fashion fabric on a living model or wooden dummy in the simultaneous search for the "movement" appropriate to the required silhouette and freedom of movement and poise, each of which two methods can additionally complement the other. Their approach makes them relatively empirical and lengthy.

When it is a matter of producing made-to-measure clothes for a given person, using a tailoring or dressmaking approach, taking into account the freedom of movement, fullness and adequate fit entails one or more fittings for appropriately adjusting the pieces of fabric relative to each other by multiple adjustments and pinning with a relative degree of accuracy and a significant loss of time both for the client and for the professional person carrying out the fitting.

A number of computerized methods reflecting these traditional approaches exist in CAD two-dimensional (2D) pattern construction. This technological input into a line of reasoning that is strictly identical to the traditional approach has no influence on the empirical nature of the translation of freedom of movement and fullness requirements, with repercussions as to the uneasy poise of the construction obtained in this way, usually requiring control or even correction "counter-types", increasing costs and time delays.

The invention aims to provide a digital method of designing clothes that eliminates the drawbacks of traditional approaches and prior art computerized methods by almost entirely eliminating the necessity to carry out checks, fittings or the like after the garment is generated digitally on the computer.

To this end, the invention provides a method of digitally designing clothes on a computer, characterized in that it includes the steps of:
  a) importing three-dimensional digital data representative of at least one portion of the body of a working virtual mannequin,
  b) generating three-dimensional digital data representative of a virtual structure including a series of lines disposed each in one of a plurality of transverse and longitudinal section planes of said working virtual mannequin body, said lines being at each point spaced by a particular distance from the surface of said body,
  c) selectively generating and displaying from said digital data at least one image of at least one area of at least one of the elements comprising said virtual structure and said portion of said working virtual mannequin body,
  d) selectively modifying at various points of said virtual structure said distance between said lines and said surface to generate a personalized virtual structure representative of said garment, and
  e) modifying said image as a function of said modifications made to said virtual structure.

According to other features of the invention said step a) comprises:
  a1) importing three-dimensional digital data representative of at least one portion of a specific virtual mannequin body, and
  a2) selectively modifying at least one morphological parameter of said specific virtual mannequin body to generate and display selectively at least one portion of said modified body constituting said working virtual mannequin body.

According to other features of the invention said three-dimensional digital data representative of at least one portion of said specific virtual mannequin body include a set of predetermined parameters for dimensions and angular positions of said specific virtual mannequin body and at least one of said parameters is modified.

According to other features of the invention, in response to the modification of at least one of the predetermined dimension and angular position parameters of said specific virtual mannequin body, others of said predetermined dimension and angular position parameters of said specific virtual mannequin body are varied in accordance with a predetermined rule.

It is therefore possible to adapt the working mannequin to a variety of forms throughout the range of recognized variation of morphological postures and dimensions that are either adopted as standards for a given population and obtained by relevant periodic surveys or entered from measurements and attitude profiles obtained in one form or another from a given individual subject.

The method according to the invention therefore applies as much to a unique mannequin considered as a reference as to a series of working mannequins representative of an expanded range of different sizes optionally integrating variations, as much of attitudes as of conformations, and also to working mannequins representative of diverse ethnic morphologies or working mannequins individualized by first transferring attitude and dimensional data specific to one or more specific clients.

Using a 3D virtual mannequin taken as a reference, the method according to the invention creates directly on that shape a virtual sublayer in three dimensions whose thickness varies in accordance with key construction points and curve and freedom of movement areas predetermined at will, validates them by eye, makes localized modifications of the required magnitude to them, obtains directly thereby a structure or shell conforming in its volume or its lines to the required garment design, without needing subsequent reworking, and finally exports external construction coordinates to a CAD system for making patterns.

The above method applies to any type of design and/or construction of clothes for men, women and children, regardless of the style, whether it is clinging, a close fit, a regular fit or a loose fit, in its entirety or in relation to any component part.

By means of successive approximations, the method allows for superposition of additional sublayers (because garments are worn one on top of another) and/or the specific thickness characterizing any incorporated materials (fur, padding, etc.). It also allows very accurately for freedom of movement margins that are necessary and sufficient for all technical clothing as a function of their specific use (for example survival gear).

The method according to the invention further includes one or more of the following features, alone or in combination:

the method includes the step of automatically adapting said digital data representative of said virtual structure in response to said modification of at least one morphological parameter of said specific virtual mannequin body, the method includes the step of transferring at least one volume of determined shape to the surface of said specific virtual mannequin body and automatically adapting said digital data representative of said virtual structure in response to the modification of said specific virtual mannequin body caused by adding said volume;

said step a1) comprises:

a1-1) capturing in three dimensions a volumetric body considered as a reference corresponding to a certain profile to obtain a raw virtual mannequin;

a1-2) controlled displacement of "vertices" of the meshing of said raw virtual mannequin to obtain a deformable virtual mannequin; and a1-3) transforming said deformable virtual mannequin in order to confer on it specific measurement and profile characteristics of a particular target person;

said transformation is based on morphological parameters that are taken selectively from a living person chosen as a basis for a design or chosen in a morphological database;

said step d) consists of identifying said points on said image of said virtual structure and selectively commanding modification of said distance to said identified points;

step d) comprises digitally smoothing the surface of said virtual structure between adjacent points whose distance from said working virtual mannequin body has been modified selectively;

said method includes a step of tracing on said image of said virtual structure and memorizing lines for opening out said virtual structure to flatten out said garment into two dimensions.

Other features and advantages of the invention will emerge from the following description of one embodiment of the invention, which description is illustrated by the accompanying drawings, in which.

FIGS. 1A, 1B are front and side elevation views of a digitized male mannequin body;

FIG. 6 is a perspective view of a part of the mannequin body showing one step of constructing a garment using the method according to the invention;

FIG. 7 is a sectional view of the mannequin body at the level of the armholes;

FIGS. 13 to 15 are partial perspective views showing a garment structure without the mannequin body;

FIG. 16 is a perspective view showing in one half a meshed structure and in the other half a textured representation of the same garment structure on the mannequin body;

FIG. 17 shows a help window relating to the attitude to be selected to confer on the virtual working mannequin an attitude identical to that of the reference model;

FIGS. 17A and 17B are figures analogous to FIGS. 1A and 1B, showing other section planes of the male mannequin body;

FIGS. 22A and 22B show typical morphological parameter variation scale tables.

In a first phase of the method according to the invention, using a succession of processing steps, there is a progressive process of importation to a specific virtual mannequin of measuring and profile data authentically representative of its group from:

either a scanned representation in three dimensions of a living person chosen as a basis for a design or as being representative of a body morphology, or morphological data extracted from a database constructed from a specific survey of the population in general or clients in particular, that data being classified in accordance with predetermined morphological profiles.

To complete this first phase successfully, the first step is to digitize a typical living body in three dimensions, based on accurate measurement and profile data A raw virtual mannequin with identical volume and attitude is obtained in this way.

Obtaining all the required flexibility, in terms of subsequent transformation/adaptation of modeling the raw virtual mannequin, starting from the mesh topology, then entails controlled displacement of the "vertices", i.e. the points of intersection of each mesh. A deformable virtual mannequin is obtained in this way.

The deformable virtual mannequin is then subjected to transformations that impart to it the specific measurement and profile characteristics of a particular target person corresponding to the design to be produced.

Figure 23:
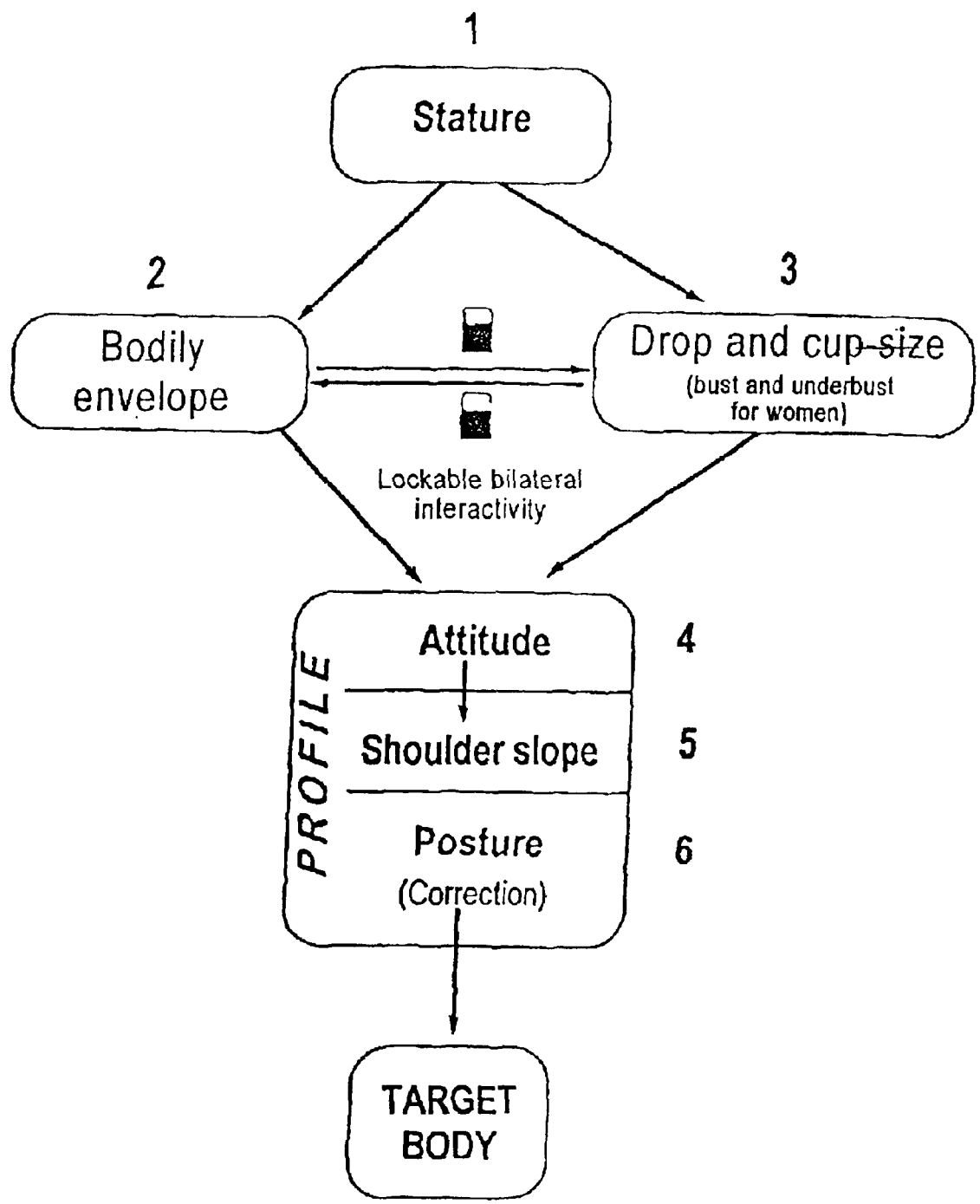
FIG. 23 is a diagram indicating the kinematics of combining key parameters to obtain a specific virtual mannequin body.

This operation is the result of combining four types of key characterization parameters in accordance with a chaining kinematic shown in FIG. 23; the parameters are either taken from the living person chosen as the basis for the design by scanning their body in three dimensions or chosen from the morphological database mentioned above.

The four types of key parameter are:

1 Group parameters: age range and sex;

2 Volumetric parameters: defined as the plus or minus variation of the horizontal volumetric mass of the body in all areas (neck, trunk (chestwaist-pelvis), upper and lower limbs excluding external bony points at joints), in accordance with a ⅓ rear profile and ⅔ front profile distribution as defined later in this description;

3 Dimensional parameters:
the stature, defined as the vertical distance in centimeters between the top of the skull and the soles of the feet,
the proportional relationship between the head-trunk height and the inseam;

4 Angular parameters:
the attitude, defined as being characteristic of the various "attitude profiles" that may be encountered: rounded or straight back, small of the back, inward or outward tilt of the buttocks, open or closed shape of the shoulders. The attitude is reflected by "angular differences" at the points of intersection of the base axes and the corresponding horizontal section planes;
the shoulder slope, defined as being characteristic of the various "shoulder profiles" that may be encountered: high or low shoulder It is reflected in an angle to the horizontal;
the posture, defined as being characteristic of the "balance-keeping" of the body consequent upon previous interference with its center of gravity, to ensure the stability of the "upright" stance. This progressive adjustment correction is effected in accordance with a predetermined mathematical law with anthropometric parameters.

FIGS. 22A and 22B show two typical tables of scales of variation of each of the above parameters, corresponding to a particular profile.

Thus at the end of this first phase of the method according to the invention, a specific virtual mannequin is obtained that is highly representative of the group.

In a second phase of the method according to the invention it is necessary to refine, adapt and modify this specific virtual mannequin to make it conform to the morphological choice made for the working mannequin on which a garment will be designed, as much with regard to dimensional factors as with regard to angular difference parameters (degree of verticality of the person or of the target population characteristic of its attitude in a natural position or by conformation silhouette compensation).

To this end, it is necessary to operate on some of the parameters mentioned above, which will now be defined more accurately with reference to FIGS. 1A, 1B, 2, 3, 17A, 17B, 18A, 18B, 19, 20, 21A and 21B.

Defining these parameters implies positioning different horizontal construction planes in direct relationship with the population to be clothed (male/female, adult/child) and as a function of the height of the specific virtual mannequin Line L0 corresponds to the stature (height) of the reference body in a position or attitude considered to be normal.

A reference section plane (line L1) of the structure as a whole is located at the height of the navel N. The horizontal plane L1 is crossed by the vertical axis A1 passing through the center of gravity of the body (fixed point F—see FIGS. 19 and 20 in particular) situated at ⅔ from the front profile and ⅓ from the rear profile.

A second plane (line L2) defines the neck size, originating in the recess under the thyroid and forming with the back slope line L3 an angle of 90° whose apex defines the back neck height point P1 (see FIG. 1B in particular). The point P1 can move in space according to the attitude of the top of the trunk, as explained further below, and defines the position of the back neck height plane line L4

The line L4 is positioned under the chin of the mannequin

The arm-hole hollow abutment line L5 is positioned by physical constraint.

The shoulder width section plane line L6 is positioned halfway between the lines L4 and L5.

The waist section plane line L7 is situated at 1/10 the distance between the lines L1 and L4, above L1

The inseam abutment section plane line L8 is positioned by physical constraint.

The hips section plane line L9 and pelvis section plane line L10 are respectively situated at ⅓ and ⅔ the distance between the lines L1 and L8, starting from the navel line L1.

The construction of the legs depends on a fundamental key measurement, the inseam.

The knee height section plane line L11 is positioned halfway between the sole of the feet plane (line L12) and the pelvis line L10.

The thigh height section plane line L13 is positioned halfway between the inseam plane line L8 and the knee line L11.

The calf section plane line L14 is positioned ⅓ the distance between the knee line L11 and the sole of the feet line L12, starting from the line L11

The ankle section plane line L15 is positioned at ⅔ the distance between the knee line L11 and the sole of the feet line L12, starting from the line L11.

To construct the arms, the length of the arm (the distance between the tip of the shoulder and the lower edge of the cubital epiphysis) is entered either from the standard morphological database, by selecting the stature and the corpulence, or directly by entering the relevant measurements.

Two section planes are positioned naturally: that at the level of the wrists L16 and that at the level of the elbows L17.

The line L18 of the section plane at the level of the biceps is halfway between the arm-hole hollow abutment line L5 and the line L17 of the elbows.

The mid-forearm section plane is placed halfway along the distance between the elbow line L17 and wrist line L16.

The bust line L23 passes through the tip of the breasts of the mannequin.

The width of shoulders (excluding arms) line L22 is situated at ¼ the distance between the line L23 and the line L4, starting from the line L23

The underbust line L24 (female mannequin—see FIGS. 21A and 21B) is abutted under the breasts.

The mid-thigh line L25 is situated at ⅓ the distance between the lines L11 and L8, starting from the line L8

Finally, if it is required to expand the working virtual mannequin to cover a range of variations for modifying, on the one hand, the stature, with or without modifying the degree of inclination, and, on the other hand, the half-chest measurement with or without modification of the "drop" (the difference between half the chest measurement and half the waist measurement for men), it is possible to obtain in this way, successively and automatically, all the mannequins spanning the required range in this way, in relation to the standard morphological database.

Attitude angular interaction integration is one of the important aspects of the working body volumetric construction method.

Figure 2:
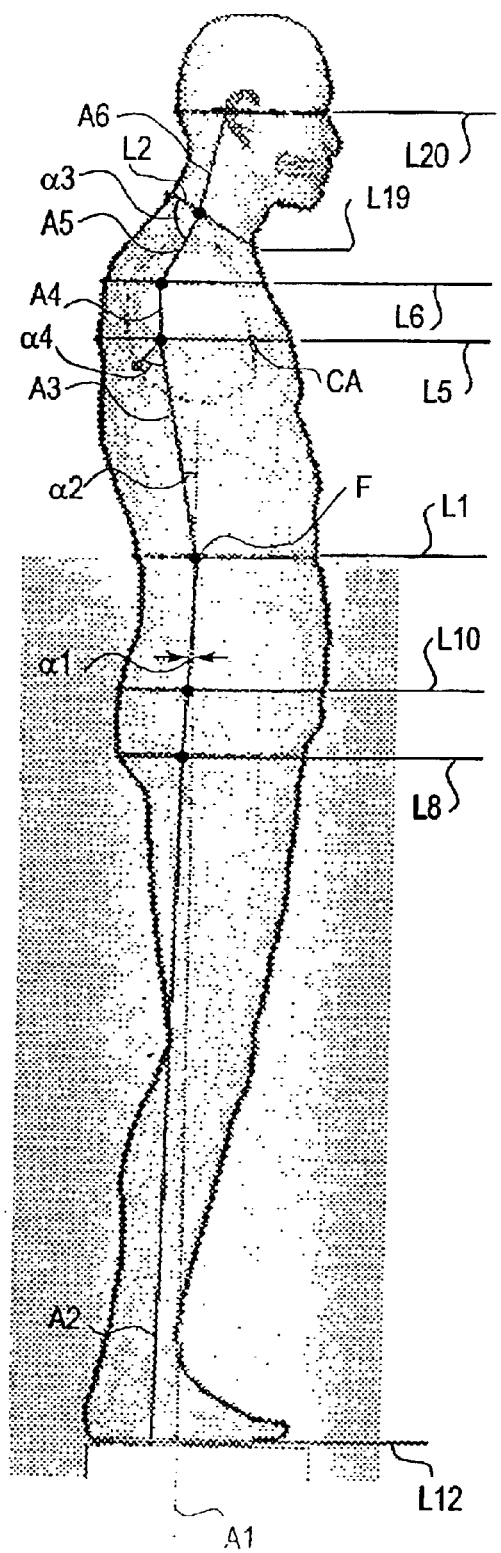
FIG. 2 is a lateral elevation view showing angular position parameters of the various parts of the male mannequin body from FIGS. 1A and 1B.
Figure 3:
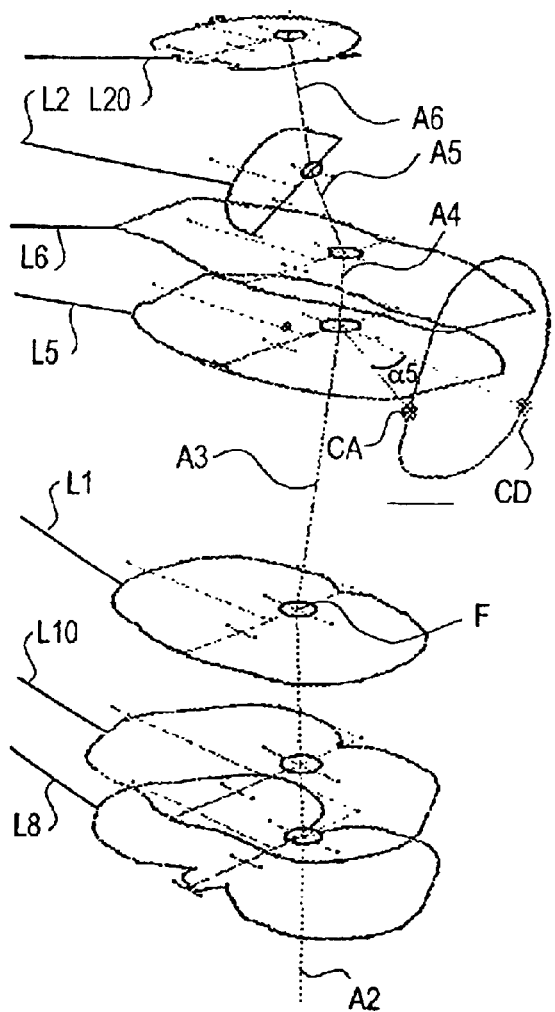
FIG. 3 is a perspective view of a series of sections of the body from FIG. 2.

As FIGS. 2 and 3 show, relative to the vertical line A1 passing through the center of gravity of the body situated in the plane L1 of the navel at ⅔ from the front profile and ⅓ from the rear profile, depending on the attitude of the subject (or the ethnic morphology concerned), as a function of their natural posture as much as of the incidence of its conformation, the effective base axes A2, A3, A4, A5, A6 are offset by a certain angle, as much below ($\alpha1$) as above ($\alpha2$, for example), on either side of the line L1 of the navel plane, to ensure equilibrium.

The points of intersection of the base axes A2, A3, A4, A5, A6 with the section plane lines L12, L10, L11, L5, L6, L2, L20 (plane of the eyes) are placed at ⅔ from the front profile and ⅓ from the rear profile, each apex corresponding to an angular difference interacting with the variation of the preceding one and the next one. This explains the various attitude profiles that can be observed in practice such as the small of the back, a rounded or straight back, impinging on the opening or closing of the width of the shoulders line and the shoulder line.

As mentioned above, the shoulder slope can also be taken into account, defined by an angle β1 to the horizontal (see FIG. 17A).

It follows from the foregoing that any modification of the stature or attitude of the specific virtual mannequin body induced by modifying the angle of any base axis to the vertical modifies one or more other angles in accordance with a predetermined law. Likewise, some modifications of dimensional parameters can generate variations of angular parameters in accordance with a predetermined rule aimed at compensating any movement of the center of gravity of the part of the body whose dimensions have been modified.

To assist the designer of the structure with regard to the posture to be imparted to the body of the working mannequin, a window can be opened on the computer screen, as shown in FIG. 17, showing all types of attitude compatible with the standing posture (angular attitude graduation scale). By selecting one of the silhouettes, the base angular parameters, referred to in connection with FIGS. 2 and 3, are displayed and transferred to the body of the working mannequin under the control of the designer.

The example taken here as a basis for demonstration is based on a reference mannequin characterized by the following essential parameters:

Male,

Stature: 177 cm,

Waist measurement: 50 cm (chest measurement 100 cm),

Drop: 8 cm,

Angular inclination (see FIG. 2):
upper area above plane L1: α2 (angle defined between lines A1 and A3): 7.5°,
lower area between L1: α1 (angle defined between lines A1 and A2): 3°.

Figures 19, 20:
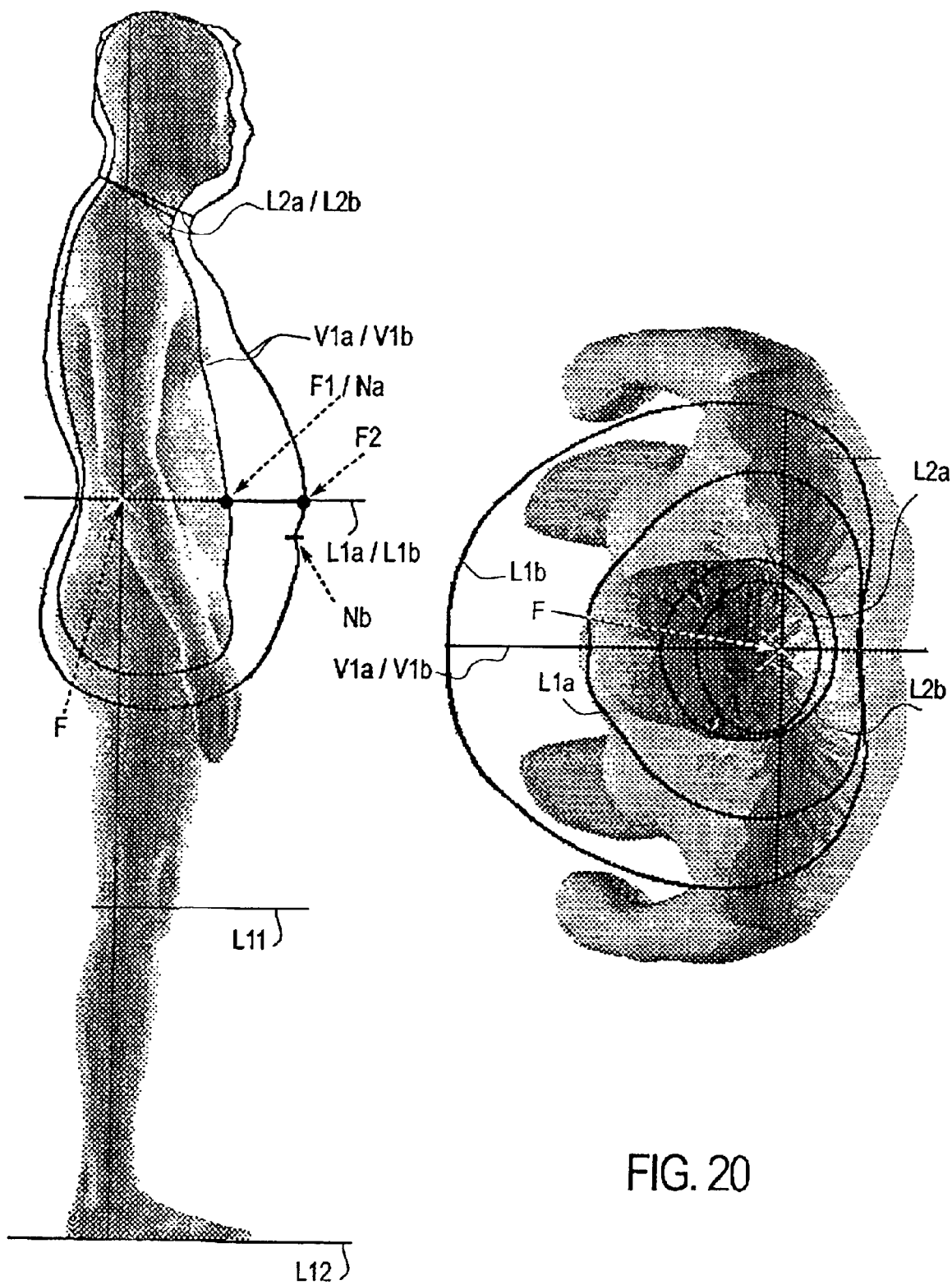
FIGS. 19 and 20 show the change from the mannequin body of FIGS. 1A, 1B to the mannequin body of FIGS. 18A, 18B, FIGS. 21A and 21B are front and side elevation views of a digitized female mannequin body.
Figure 21A:
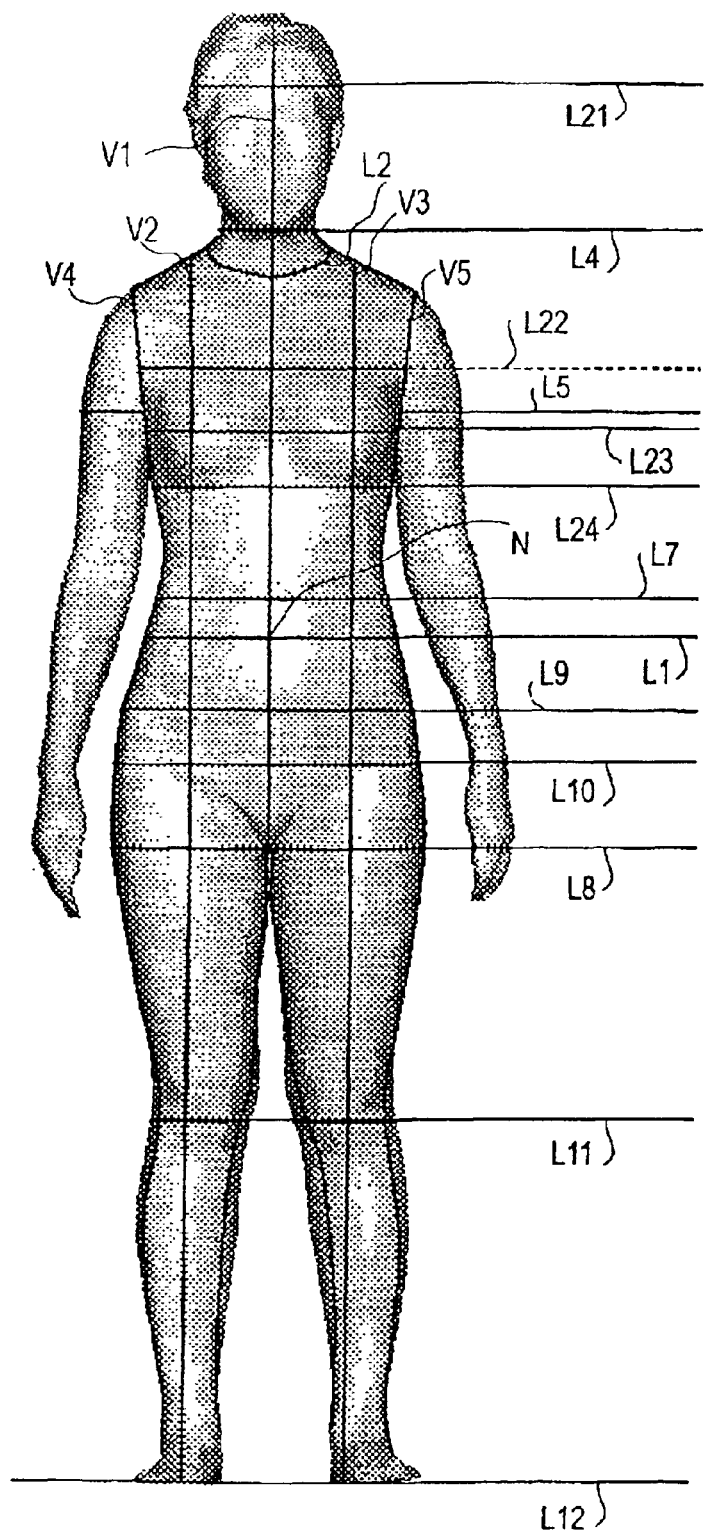
Figure 21B:
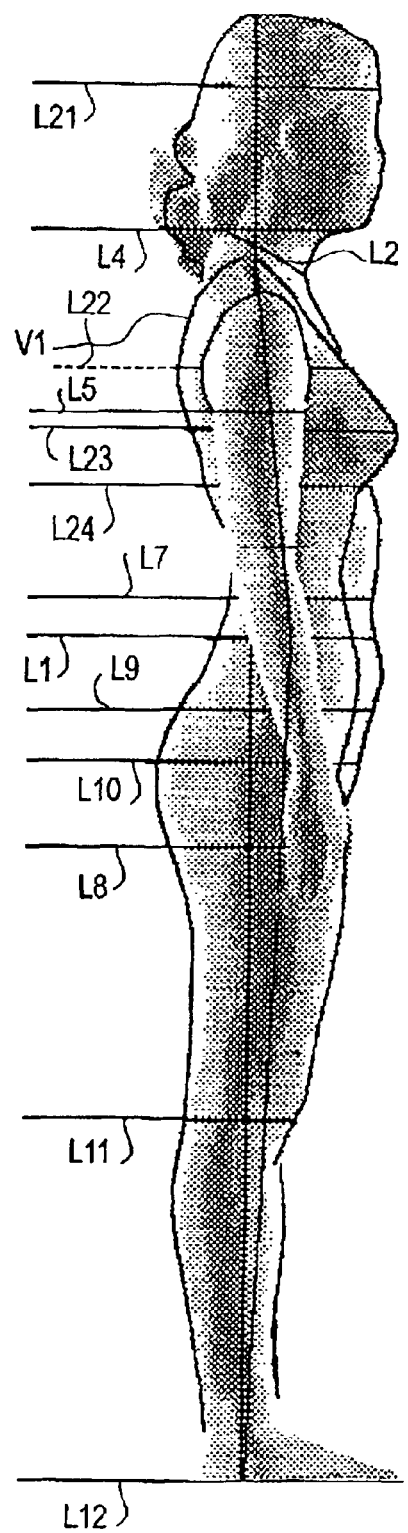

As shown by FIGS. 19 and 20, the corpulence of the working mannequin can be modified at will. In that figure, items relating to a "thin" mannequin carry the suffix "a" and those relating to a "fat" mannequin carry the suffix "b": it can be seen that modifying the corpulence modifies the position of a number of characteristic points, in particular the position of the navel (F1, F2)

The point F2 in fact no longer really symbolizes the position of the navel, since it is necessary to consider sagging of the masses due to the significant increase in weight in this example. The navel of the body "b" is in fact at Nb.

The working body generated as described above is used to generate a garment structure, i.e. a set of contour lines preferentially placed in the various planes previously envisaged.

Figures 4, 5:
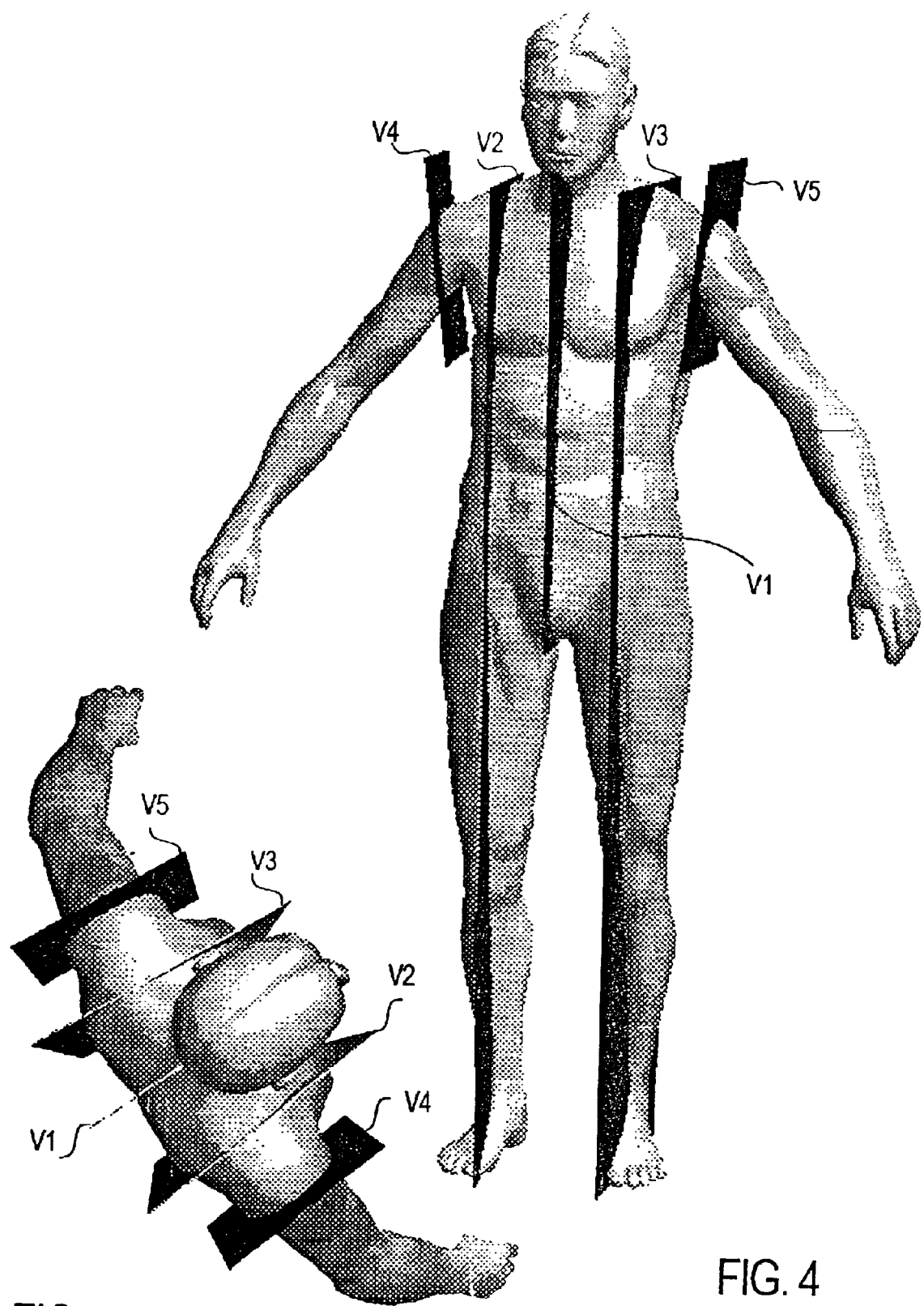
FIGS. 4 and 5 are elevation and plan perspective views showing a number of vertical section planes for the mannequin body.

FIGS. 4 and 5 illustrate the positioning of the vertical planes specific to the garment construction. Five vertical planes ensure the hang and line of the garment:

The vertical middle plane (of symmetry) V1 of the body (front/back), fixed by state;

The right-hand vertical plane V2 and left-hand vertical plane V3 on which rest the "bearing points" of the whole of the garment construction, which points are situated on the shoulder line halfway between the plane V1 and the tip of the shoulder. The more or less open positioning of these planes (i.e. their angle to the plane V1) is related to the angular interactivity previously mentioned. These vertical "bearing point" planes are also used as a reference to define the "hang" of the garment;

The right-hand vertical arm-hole plane V4 and the left-hand vertical arm-hole plane V5, equally in angular interactivity, and vertically aligned with the tip of the shoulder and the hollow of the bottom of the arm.

The working mannequin having been constructed beforehand, as described, the five vertical planes can be displayed automatically on the silhouette of the mannequin to assist with subsequent operations The concept of freedom of movement is fundamental with regard to the comfort and right feel of any type of garment and any part thereof. This freedom of movement corresponds to the space to be provided between the body and the layer of clothing to ensure perfect mobility when wearing the garment, given that the nature of the textile or other fabric used, by virtue of its own thickness as well as its flexibility or stiffness, will condition the necessary space (sublayer) to be maintained between the body and the fabric (this "technical freedom of movement" can be zero or even negative in the case of elastic materials)

To meet this objective, a computer toolbox is provided including markers, referred to hereinafter as tabs T, which can be placed at required locations on the virtual structure ○ previously cited in the manner shown in FIGS. 6 and 7. The purpose of the tabs T is to enable segmentation at will of the peripheral contours corresponding to the various planes indicated above. Each section delimited in this way corresponds to a freedom of movement value (distance between garment and body) to be defined, the whole being reflected in a peripheral dimension of the virtual structure ○ different from the peripheral dimension of the line fitted to the body C of the mannequin, the sublayer redimensioning line being smoothed digitally.

In precise circumstances, it is possible to add the thickness of a plurality of freedom of movement zones (e.g. lining+interlining+shoulder-pad). Plane-to-plane interaction ensures perfect distribution of the multiple freedom of movement sublayer over the whole of the volume concerned.

The curve concept corresponds to the surface contour to be obtained to impart the required line to the silhouette.

Beyond the freedom of movement sublayer, it is therefore a question of creating a second (curve) sublayer varying according to the portion of the garment to be constructed to impart thereto the style, the required silhouette.

To this end, the toolbox is used to set tabs delimiting vertical and horizontal areas on existing peripheral lines of the virtual structure ○ as in relation to new complementary lines (the numbers and positions of which are chosen at will), this segmentation giving rise to the entry of the required curve value reflected in curves that can be deformed and smoothed to yield the required silhouette.

Some specifically identified construction curves of this curved shape can be used as seam lines (panels, cut-outs, darts, yokes. etc.)

This styling effected directly in three dimensions is equally possible on upper body garments with or without sleeves and on items relevant only to the legs (trousers, skirts, etc).

Special attention is paid to the treatment of freedom of movement at the level of the joints (shoulders, elbows, hips, knees), to ensure that they have all the necessary motility, despite the layers of clothing.

If the garment to be created has sleeves, to allow total freedom of movement of the hinge joint attaching the arm to the trunk, with the normal amplitude, it is necessary to impart some expansion capacity at the level of the joint area, failing which movement of the joint is either impeded or entrains the whole of the rest of the garment.

The specific freedom of movement expansion, to be distributed fanwise over the two articulated parts of the garment, is carried out in accordance with rules specific to each case and as a function of the nature, the degree of stiffness-flexibility and the thickness of the fabric, as well as the style and the degree to which the sheath can float at the level of the hinge point.

Figure 10:
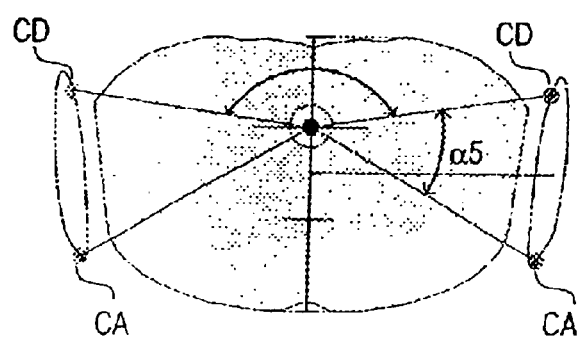
FIG. 10 is a sectional view analogous to FIG. 7.
Figure 8:
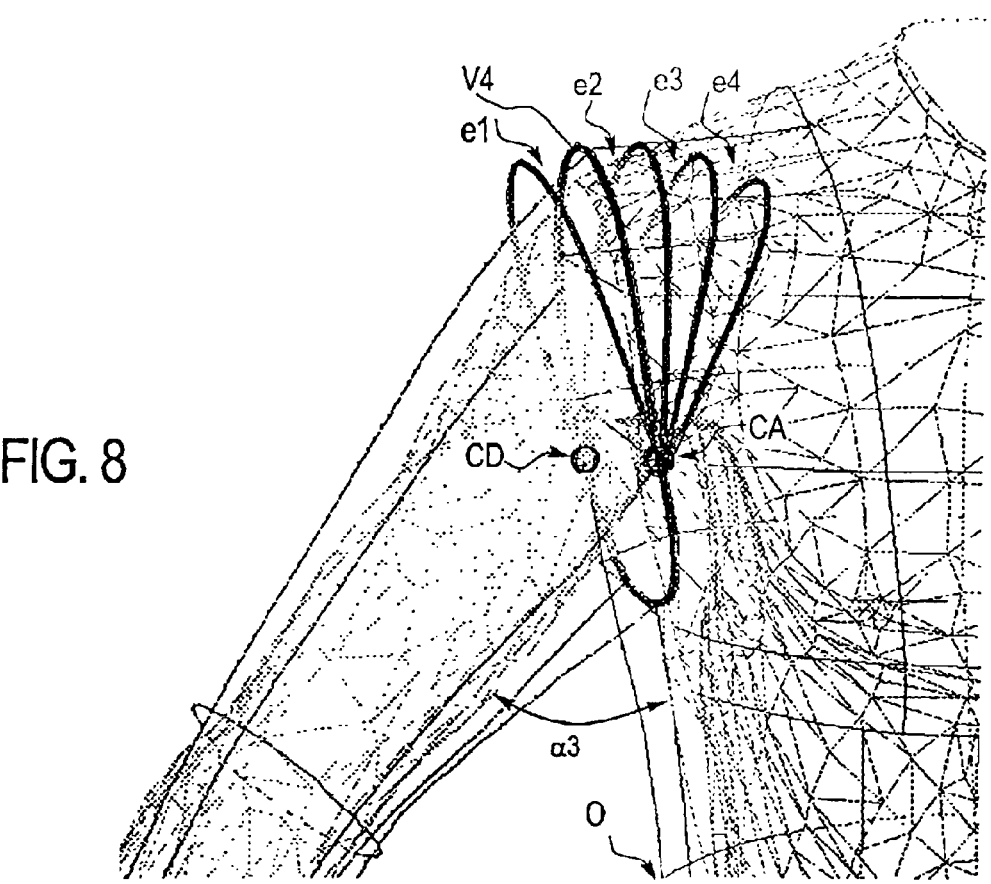
FIGS. 8 and 9 are perspective views illustrating the design of the arm-holes of a garment using the method according to the invention.
Figure 9:
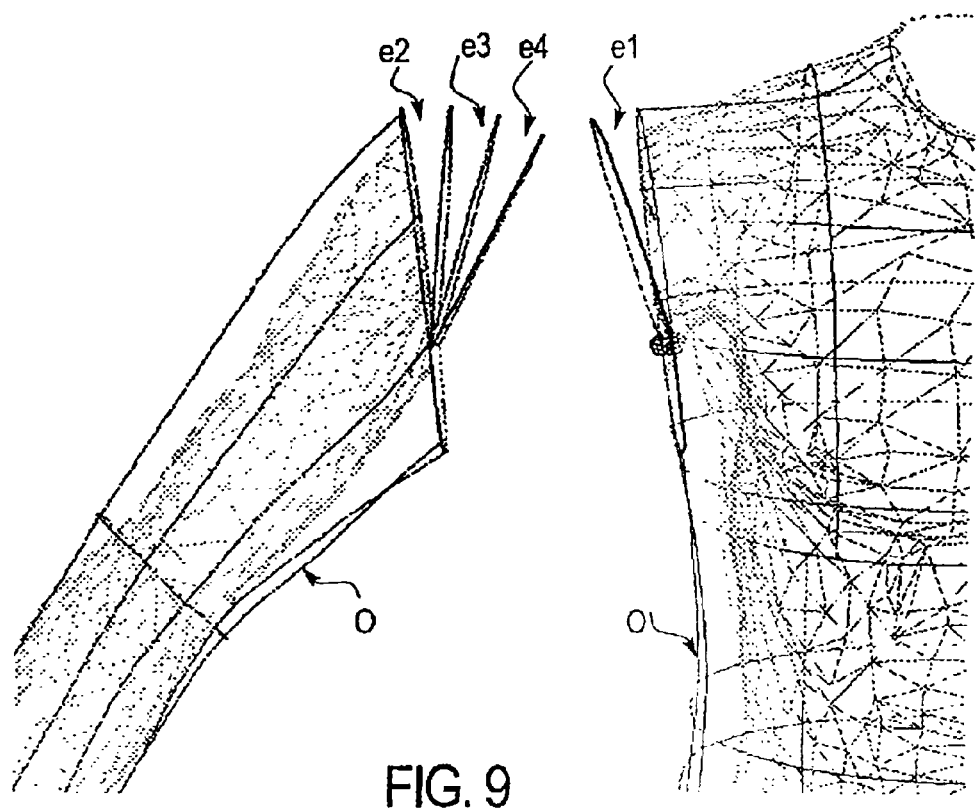

As shown in FIGS. 8 and 9, for example, to design a man's blazer, for a normal optimum amplitude of movement of the arm of the order of 90°, the necessary expansion is calculated by positioning the arm on the bisector at 45° (angle $\alpha 6$ in FIG. 8), yielding an expansion fan relative to the vertical arm-hole plane V4 or V5 (FIG. 4) of the same magnitude, the 45° being divided into quarters: 11.5° of arm-hole advance e1, 34.5° top of sleeve complement e2, e3, e4. These freedom of movement expansions are based on arm-hole front and rear hinge points CA and CD (see also FIG. 10), there being no freedom of movement in the bottom part of the arm-hole. This expansion motility is obtained automatically as soon as the chosen opening angle is entered.

What is true for processing the arm-hole junction is equally true for the elbow junction if the garment has long sleeves, although the processing is of smaller magnitude.

This applies equally to processing the joints of the leg.

On reaching this point, there are displayed both the mannequin with its modified structure and, superposed on it, the various vertical and peripheral construction lines, with their expansion chosen in accordance with the entered freedom of movement and curve values, together with the delimiter lines of areas of panels, thereby showing the expansion of the shapes of the structure.

Figure 11:
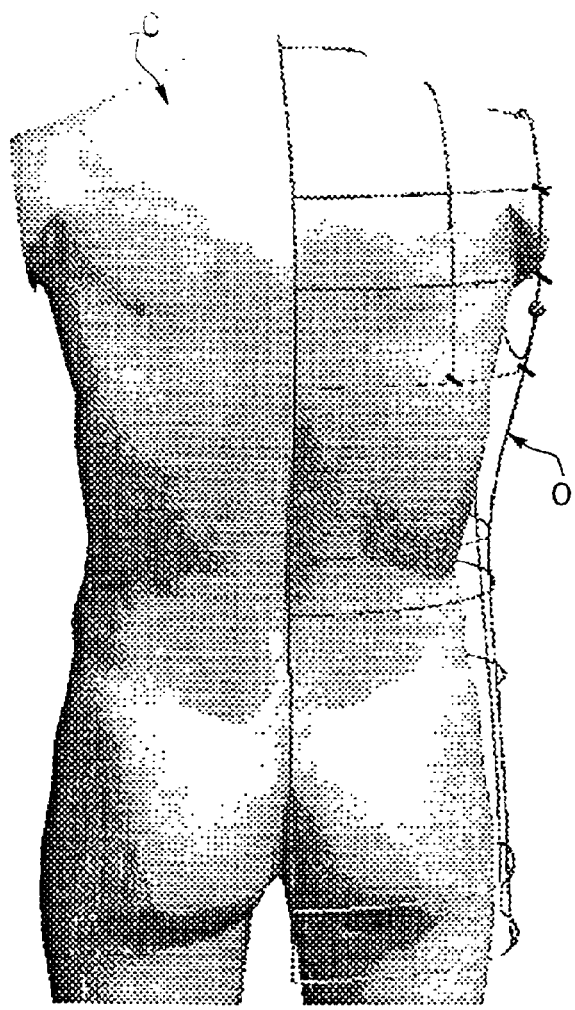
FIGS. 11 and 12 are partial perspective views illustrating the superposition of a garment structure on the mannequin body.
Figure 12:
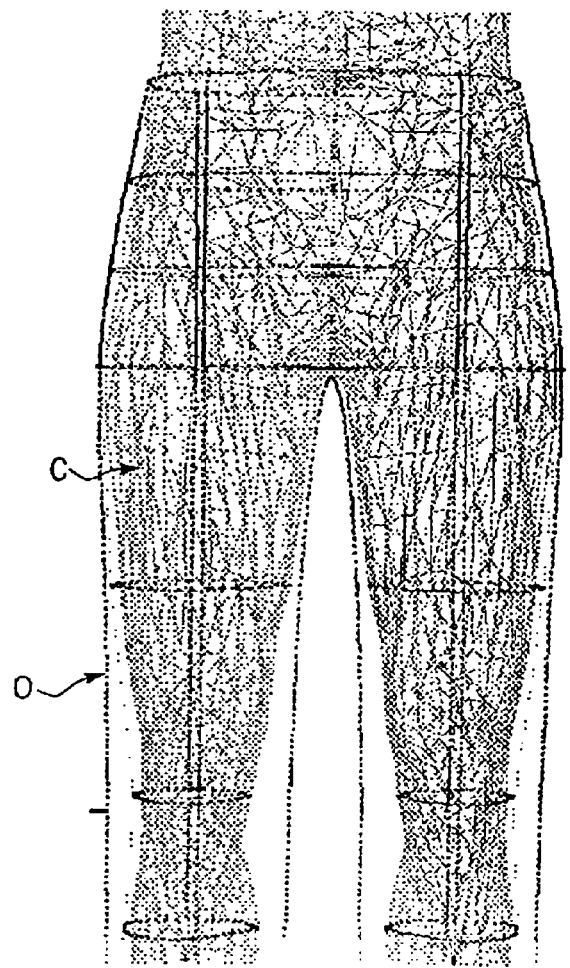
Figure 18A:
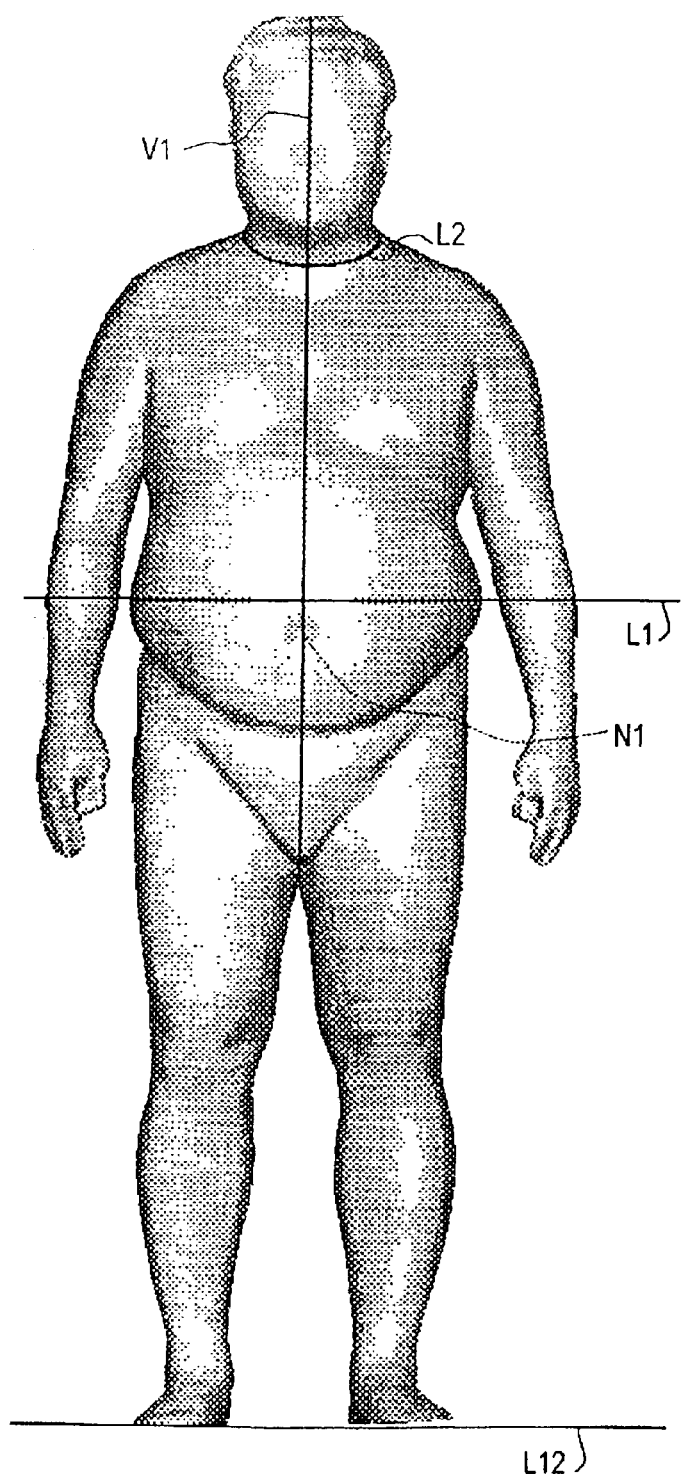
FIGS. 18A and 18B show a relatively corpulent mannequin body.
Figure 18B:
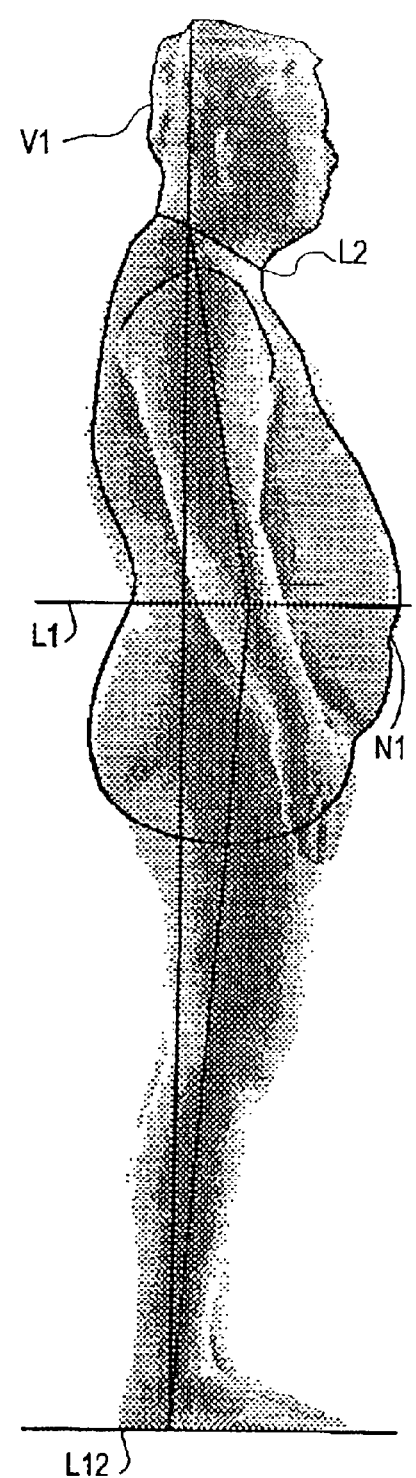

As is well known in the field of modeling techniques, it is possible to have an overview that is both circular (top front, sides, back) by rotation, with individual stopping points selected at will, and at various projection angles (see FIGS. 11 and 12), in order to be able to assess fully the freedom of movements, shapes and curves entered in this way according to the sections and the areas, and their validity and consistency with the 3D architectural construction lines.

It is also possible to visualize in 3D and in an orbital fashion, separated from the mannequin, the meshed shape of the virtual structure O (FIGS. 13, 14 and 15) and/or the textured shape of the virtual structure (FIG. 16) obtained, to appreciate better the general line conferred on the garment. This virtual structure, once converted into a basic pattern, will ensure a unity of style and a permanent right feel for all designs produced by modifying the basic image from that form.

By using it iteratively, the method enables very accurate modifications and/or adjustments to be made at will, before memorizing the basic virtual structure O integrating the technical freedom of movement data as well as the silhouette stylistic volume data entered, ensuring freedom of movement and right feel.

The method described provides the possibility of drawing on the virtual structure O constructed in this way lines separating and joining panels to be combined corresponding to subsequent lines of seams, darts, pleats, etc.

The method described uses known techniques to transfer memorized digital data relating to opening-out lines and coordinates for flattening the virtual structure O to any compatible CAD system for making 2D/3D patterns or to any numerically controlled cutting machine. This ensures, firstly, flattening out of the structure into the form of a 2D pattern, guaranteeing the validity of the design and silhouette bases of the resulting patterns for the designs obtained.

The flat pattern can have added to it all the personalization add-ons for the design before it is used as a basis for cutting the fabrics and materials employed.

It is to be noted that the method described enables working on one portion of the mannequin only (trunk, pelvis, legs, etc.), at will and as required, depending on the nature of the product being designed (waistcoat, jacket, trousers, skirt, etc.).

All the data obtained from the construction can be stored and modified at will on the computer.

What is more, when it is used to produce design mannequins and trial mannequins for special clothes such as uniforms, stage costumes, protection and survival garments, the method described ensures that the technical standards of freedom of movement are valid and that their very accurate positioning is included in the specification.

The method described applying to all forms of garment for men, women and children, accessories can be included in the "toolbox" corresponding either to natural but variable areas of curves of the body (cup size/distance between and height of nipples) or to artificial but voluntary modifications of the silhouette of the body proper (brassiere, shoulder-pad, padding, etc.). When these add-ons are called up, they are added to the basic body, in precisely the required position, to modify its dimensional and profile data.

Through successive approximations, the method described allows superposition of additional sub-layers (stratum concept), because garments are worn one over the other and/or because of the thickness characterizing some particular incorporated materials (fur, padding, etc.). Likewise, it can take account of freedom of movement margins necessary and sufficient for all technical garments as a function of their specific use (protection, survival, etc. garments).

The method described applies as much to a unique mannequin, regarded as a reference, as to a mannequin individualized by the prior transfer of dimensional and morphological data specific to a particular person, and as to any series of mannequins representative of an expansion range of different sizes, where applicable integrating variations of attitude and conformation.

In this phase of expansion of sizes (grading operation), the freedom of movement sublayer is automatically positioned in accordance with the same absolute values of the difference relative to the body measurements as those retained for the basic size working mannequin, whereas the measurements of the virtual structure with curves will follow proportionately the variations in the measurements of the bodies successively graded according to their sizes.

In that the design or construction study for a given garment is based on a reference definition (reference size), over a grid that might be called a window, the method enables manual entry and display of variations of data at the level of each key measurement parameter (planes and lengths), with the modification entered shown opposite the reference data. Any change of this kind will automatically be reflected in a transformation of the virtual structure in terms of volumetric variation (greater or lesser volume) and also in terms of gravity compensation and therefore angular distribution.

By validating this step, a display will show the real appearance of the body as well as a set of curves relating to the initial commands of a pattern.

The reference virtual structure will thereby be automatically converted without losing its freedom of movement and curve characteristics

What is claimed is:

1. A method of digitally designing clothes on a computer, characterized in that it includes the steps of:
    a) importing three-dimensional digital data representative of at least one portion of the body of a working virtual mannequin,
    b) generating three-dimensional digital data representative of a virtual structure including a series of lines disposed each in one of a plurality of transverse and longitudinal section planes of said working virtual mannequin body, said lines being at each point spaced by a particular distance from the surface of said body,
    c) selectively generating and displaying from said digital data at least one image of at least one area of at least one of the elements comprising said virtual structure and said portion of said working virtual mannequin body,
    d) selectively modifying at various points of said virtual structure said distance between said lines and said surface to generate a personalized virtual structure representative of said garment,
    e) modifying said image as a function of said modifications made to said virtual structure, and
    f) designing a three-dimensional garment pattern from said modified image.

2. A method according to claim 1, characterized in that said step a) comprises:
    a1) importing three-dimensional digital data representative of at least one portion of a specific virtual mannequin body, and
    a2) selectively modifying at least one morphological parameter of said specific virtual mannequin body to generate and display selectively at least one portion of said modified body constituting said working virtual mannequin body.

3. A method according to claim 2, characterized in that said three-dimensional digital data representative of at least one portion of said specific virtual mannequin body include a set of predetermined parameters for dimensions and angular positions of said specific virtual mannequin body and in that said step a2) consists of modifying at least one of said parameters.

4. A method according to claim 3, characterized in that, in response to the modification of at least one of the predetermined dimension and angular position parameters of said specific virtual mannequin body, said step a2) consists in varying others of said predetermined dimension and angular position parameters of said specific virtual mannequin body in accordance with a predetermined rule.

5. A method according to claim 2, characterized in that it includes the step of automatically adapting said digital data representative of said virtual structure in response to said modification of at least one morphological parameter of said specific virtual mannequin body.

6. A method according to claim 5, characterized in that it includes the step of transferring at least one volume of determined shape to the surface of said specific virtual mannequin body and automatically adapting said digital data representative of said virtual structure in response to the modification of said specific virtual mannequin body caused by adding said volume.

7. A method according to claim 2, characterized in that said step a1) comprises:
    a1-1) capturing in three dimensions a volumetric body considered as a reference corresponding to a certain profile to obtain a raw virtual mannequin;
    a1-2) controlled displacement of "vertices" of the meshing of said raw virtual mannequin to obtain a deformable virtual mannequin; and
    a1-3) transforming said deformable virtual mannequin in order to confer on it specific measurement and profile characteristics of a particular target person.

8. A method according to claim 7, characterized in that said transformation is based on morphological parameters that are taken selectively from a living person chosen as a basis for a design or chosen in a morphological database.

9. A method according to claim 1, characterized in that said step d) consists of identifying said point on said image of said virtual structure and selectively commanding modification of said distance to said identified points.

10. A method according to claim 9, characterized in that said step d) comprises digitally smoothing the surface of said virtual structure between adjacent points whose distance from said working virtual mannequin body has been modified selectively.

11. A method according to claim 1, characterized in that it includes a step of tracing on said image of said virtual structure and memorizing lines for opening out said structure to flatten out said garment into two dimensions.

12. The method of claim 1 wherein:
    the working virtual mannequin body has five longitudinal section planes comprising:
        a vertical middle plane disposed in a plane of symmetry for the virtual mannequin body,
        right- and left-hand vertical planes that each intersect a bearing point of the garment on a shoulder line halfway between the vertical middle plane and a respective shoulder tip of the virtual mannequin body, and
        right- and left-hand arm-hole vertical planes that each align with a respective shoulder tip and the hollow of the bottom of a corresponding arm of the virtual mannequin body; and
    the five vertical planes are displayed on a silhouette of the virtual mannequin body to visually assist an operator in generating the personalized virtual structure representing the garment.

13. The method of claim 1 further comprising adding freedom of movement sublayers, each defining a thickness, to the virtual structure at a zone selected by an operator so as to selectively modify the distance between the virtual structure and the surface of the virtual mannequin body at the zone in accordance with the combined thicknesses of the freedom of movement sublayers.

14. The method of claim 1 further comprising displaying a three-dimensional image of the textured shape for the personalized virtual structure representing the garment.

* * * * *